(12) United States Patent
Dietschreit

(10) Patent No.: US 10,300,414 B2
(45) Date of Patent: May 28, 2019

(54) SCREEN NETTING AND METHOD FOR PRODUCING A SCREEN NETTING

(71) Applicant: Siebtechnik GmbH, Mülheim an der Ruhr (DE)

(72) Inventor: Horst Dietschreit, Mülheim an der Ruhr (DE)

( * ) Notice: Subject to any disclaimer, the term of this patent is extended or adjusted under 35 U.S.C. 154(b) by 167 days.

(21) Appl. No.: 14/859,225

(22) Filed: Sep. 18, 2015

(65) Prior Publication Data

US 2016/0082374 A1 Mar. 24, 2016

(30) Foreign Application Priority Data

Sep. 19, 2014 (DE) .................. 10 2014 013 650

(51) Int. Cl.
| | | |
|---|---|---|
| *B01D 39/10* | (2006.01) | |
| *B07B 1/46* | (2006.01) | |
| *B24C 1/04* | (2006.01) | |
| *B24C 5/02* | (2006.01) | |
| *B26F 3/00* | (2006.01) | |
| *B01D 39/16* | (2006.01) | |
| *B01D 39/20* | (2006.01) | |

(52) U.S. Cl.
CPC ......... *B01D 39/10* (2013.01); *B01D 39/1692* (2013.01); *B01D 39/2068* (2013.01); *B07B 1/4618* (2013.01); *B24C 1/045* (2013.01); *B24C 5/02* (2013.01); *B26F 3/004* (2013.01)

(58) Field of Classification Search
CPC ..................................................... B01D 39/10
See application file for complete search history.

(56) References Cited

U.S. PATENT DOCUMENTS

| | | | | |
|---|---|---|---|---|
| 5,587,077 A | * | 12/1996 | Aaltonen | B01D 29/012 210/498 |
| 6,165,323 A | | 12/2000 | Shearer | |
| 6,617,023 B2 | * | 9/2003 | Tsutsui | D01D 5/24 428/370 |

FOREIGN PATENT DOCUMENTS

| | | |
|---|---|---|
| DE | 692 08 100 T2 | 9/1992 |
| DE | 295 17 982 U1 | 11/1995 |

OTHER PUBLICATIONS

German Search Report dated Sep. 9, 2014.

* cited by examiner

*Primary Examiner* — Margaret G Moore
(74) *Attorney, Agent, or Firm* — Robert F. Zielinski; Frank-Oliver Methling

(57) ABSTRACT

The invention relates to a method for producing a screen netting (1), whereby openings (2) are made in a blank by means of water jet cutting, whereby the water jet cutting is carried out in several steps, whereby in a first step, a pre-cutting of the openings (2) of the screen netting (1) is carried out, and in at least one second step, a finish-cutting of the openings (2) of the screen netting (1) is carried out. The invention also relates to a screen netting (1) that is produced in such a way.

15 Claims, 7 Drawing Sheets

SCREEN NETTING AND METHOD FOR PRODUCING A SCREEN NETTING

The invention relates to a method for producing a screen netting, whereby openings are made in a blank by means of water jet cutting.

The invention also relates to such a screen netting with openings, which were made in a blank by means of water jet cutting.

Various methods for producing a screen netting are known, in which in a blank of the screen netting, openings are made by means of water jet cutting. DE 692 08 100 T2 shows such a method.

In order to keep the openings from clogging up, it is advantageous when the openings widen in the direction of flow.

It is disadvantageous in the known method for producing a screen netting with openings that because of the production method, the opening angle of the openings in the direction of flow is limited to a very small size.

The object of the invention is to indicate a method for the production of a screen netting, by means of which it is possible to produce any opening angle of the screen openings in the direction of flow and to manufacture a corresponding screen netting. It is another object of the invention to indicate a screen netting in which the opening angle of the openings in the direction of flow can be selected at will in order to obtain the desired screen properties.

This object is achieved according to the invention by a method according to Claim 1 as well as a screen netting according to Claim 11. Advantageous further developments of the invention are indicated in the subclaims.

It is especially advantageous in the method for producing a screen netting, whereby openings are made in a blank by means of water jet cutting, that the water jet cutting is carried out in several steps, whereby in a first step, a pre-cutting of the openings of the screen netting is carried out, and in at least one second step, a finish-cutting of the openings of the screen netting is carried out.

The openings can be made circular or oval or in such a way that their length is greater than their width. Differently-shaped openings in a screen netting can also be combined, since the control of the cutting unit in the case of multi-stage water jet cutting can be carried out at will.

According to the invention, it is thus provided to produce the openings in the screen netting by a multistage water jet cutting, in particular by a two-stage water jet cutting, whereby in a first production step by means of water jet cutting, the openings are pre-cut and whereby in a second production step, the finish-cutting of the openings of the screen netting is also performed by means of water jet cutting.

In the first step of the pre-cutting, a modeling of the opening width and the opening angle of the openings that widen in the direction of flow is thus carried out, whereby in the second step of the finish-cutting, the definition of the hole size or slot width of the openings is carried out depending on which basic shape is selected for the openings. Also, various basic shapes of openings can be combined with one another, such as the circular shape, oval shape or slot shape, in particular slots that run straight and/or that run in a curvilinear manner. The openings can be arranged in particular at the same height and/or offset to one another on the screen netting in lines that run parallel to one another. The arrangement of the openings on the screen netting can be regular or irregular.

Other production steps, in particular several additional production steps, can also be provided, however, by means of water jet cutting, so that the production of openings is carried out in more than two production steps. It is especially advantageous, however, when the latter is carried out in two production steps by means of water jet cutting.

In this case, during water jet cutting with water that is under high pressure and in particular an abrasive additive, such as, for example, corundum, material is removed in order to produce the openings of the screen netting in this way. In this case, the openings are designed as circular and/or oval and/or slot-shaped screen openings. Preferably, the screen netting has a number of circular and/or oval and/or slot-shaped openings.

The blank, from which the screen netting is produced by a multi-stage water jet cutting, can in this case be formed by a metal sheet, in particular a piece of sheet steel or high-grade sheet steel, or by plastic or ceramic. Such a sheet material that forms the blank can have a thickness of several millimeters, such as, for example, 2 mm, 3 mm, 4 mm, 5 mm or more. The desired strength values of the screen netting can be achieved by the material selection and the selected thickness of the material, which values are necessary for the use of the screen netting in a screening machine or screening centrifuge or other dehumidification device. In this case, the screen netting can be provided for use in a screening machine or a sieve-type screw centrifuge, push compressor, or oscillating-screen centrifuge or other dehumidification units.

In the case of several, in particular two, production steps, the same abrasive additive can be used by means of water jet cutting for pre-cutting and for finish-cutting the openings. As an alternative, in the case of two production steps in the form of water jet cutting for pre-cutting and for finish-cutting, different abrasive additives can be added to the pressurized water.

In this case, the pre-cutting and/or the finish-cutting can be performed by means of water-abrasive-suspension jet cutting or by means of water-abrasive-injector jet cutting. During water-abrasive-injector jet cutting, abrasive is suctioned off from a storage container, whereby based on the procedure, small amounts of air are suctioned off. During water-abrasive-suspension jet cutting, however, a suspension that consists of water containing an abrasive is suctioned off from a storage container, whereby no air bubbles are contained in the suspension. From this results a finer cross-sectional image during water-abrasive-suspension jet cutting than during water-abrasive-injector jet cutting. Both production steps of the pre-cutting and the finish-cutting can be implemented with the same water jet cutting method or with different water jet cutting methods in any combination.

In this case, the pre-cutting and/or the finish-cutting of the openings of the screen netting is/are preferably carried out from the side of the screen netting, which forms the bottom of the screen netting.

The direction of flow of the openings in the screen netting in this case runs from the top of the screen netting to the bottom of the screen netting.

By the pre-cutting and/or the finish-cutting of the openings from the bottom of the screen, it is possible, by means of water jet cutting, to produce very fine openings, i.e., exactly defined circular or oval openings or narrow slots in the screen netting, without resulting in shape deviations on the edges of the screen openings.

Preferably, the pre-cutting and the finish-cutting are done by means of two nozzles, in particular arranged behind one another, on a nozzle head.

By such an arrangement of two nozzles on a nozzle head, the pre-cutting and the finish-cutting can be carried out directly after one another within a single operation.

Thus, the production of the openings in the screen netting can be carried out by means of a nozzle in two or more steps. As an alternative, the possibility exists that the production of openings in the screen netting is carried out in a single operation with several nozzles arranged behind one another, whereby by means of a first nozzle, the pre-cutting is performed in the form of a modeling of the opening angle of the opening by means of water jet cutting, and by means of a second nozzle, the finish-cutting of the actual openings is performed by means of water jet cutting.

In this case, the pre-cutting and the finish-cutting can be performed by means of two nozzles, which are loaded with the same water pressure or which are loaded with different water pressures. In particular, the finish-cutting can be performed at a higher water pressure than the pre-cutting. As an alternative, the pre-cutting can be performed at a higher water pressure than the finish-cutting.

Preferably, the pre-cutting is carried out with an abrasive additive, in particular with a suspension that contains an abrasive additive.

Preferably, the finish-cutting is carried out with an abrasive additive, in particular is carried out with a suspension that contains an abrasive additive.

The distance between nozzle and workpiece during pre-cutting is especially preferably greater than the distance between nozzle and workpiece during finish-cutting.

It has been shown that the opening angle of the screen openings that is produced in the direction of flow is in particular dependent upon the distance from the nozzle to the workpiece during pre-cutting. The greater the distance from the nozzle to the workpiece during pre-cutting, the greater the opening angle of the screen opening. Conversely, the opening angle of the openings in the screen netting in the direction of flow is smaller, the nearer the nozzle is to the workpiece during pre-cutting. Thus, any opening angle of the openings in the screen netting in the direction of flow can be adjusted by the adjustment of the distance between nozzle and workpiece during pre-cutting.

Other important influencing factors for the opening angles of the openings produced based on the modeling during pre-cutting are the flow of abrasive material as well as the water pressure and the cutting speed. With decreasing water pressure, the opening angle of the openings is increased. With decreasing cutting speed, i.e., the feeding speed during pre-cutting, the opening angle of the openings also increases. The desired opening angle of the openings can be produced by the corresponding selection and determination of the influencing factors.

Preferably, the distance between nozzle and workpiece and the other influencing factors are set during pre-cutting in such a way that the opening half angle of the openings relative to the perpendicular is 5°-15°, in particular up to 20°.

The finish-cutting is preferably carried out at a smaller distance from the nozzle to the workpiece than during modeling of the opening angle during pre-cutting. In this case, the width of the openings is dependent upon the nozzle that is used, i.e., the cutting width of the openings is dependent upon the diameter of the nozzle used during finish-cutting. Very fine and narrow openings can be produced by the use of corresponding nozzles during finish-cutting, such as, for example, narrow slot-shaped screen openings of, for example, a 0.2 mm width of the openings in the sieve.

The wider the openings on the top of the screen netting are to be, the larger the diameter of the nozzle to be selected during finish-cutting.

In the method according to the invention for the production of a screen netting, only a material removal is thus carried out during pre-cutting by means of water jet cutting, whereby no through-going openings are cut through the thickness of the material from the top to the bottom of the screen netting. The pre-cutting thus corresponds to a modeling of the opening angle of the through openings in the sieve.

In this process of pre-cutting by means of water jet cutting, in particular the distance between nozzle and workpiece thus forms a decisive production factor, since on this score, the opening angles of the openings can be varied in the direction of flow. In addition, the additional influencing factors of the flow of abrasive material as well as water pressure and cutting speed during pre-cutting are also to be set accordingly.

During finish-cutting by means of a second production cut by means of water jet cutting, the production of openings, in which fine and clearly defined round and/or oval and/or oblong openings are cut into the screen netting, is then done.

The screen netting according to the invention with openings that were introduced into a blank by means of water jet cutting is thus characterized in that the water jet cutting is carried out in several steps, whereby in a first step, a pre-cutting of the openings of the screen netting is carried out, and in at least one second step, a finish-cutting of the openings of the screen netting is carried out. Preferably, such a screen netting is produced according to the previously-explained method according to the invention.

Accordingly, a modeling of the opening angle of the openings in the direction of flow is carried out in a first step, and the finish-cutting with the desired opening size of the openings in the screen netting is carried out in a second step.

In this case, during water jet cutting with water that is under high pressure and in particular an abrasive additive, such as, for example, corundum, material is removed in order to produce the openings of the screen netting in this way. In this case, openings are made as round and/or oval and/or slot-shaped screen openings.

Preferably, these round and/or oval and/or slot-shaped screen openings are arranged in the screen netting in lines that run parallel to one another. Accordingly, the screen netting preferably has a number of round and/or oval and/or slot-shaped openings, which are arranged in the screen netting at the same height and/or offset to one another.

The blank, from which the screen netting is produced by a multi-stage water jet cutting method, can in this case be formed by a metal sheet, in particular a piece of sheet steel or high-grade sheet steel, or by plastic or ceramic. Such a sheet material that forms the blank can have a thickness of several millimeters, such as, for example, 2 mm, 3 mm, 4 mm, 5 mm or more. The desired strength values of the screen netting can be achieved by the material selection and the selected thickness of the material, which values are necessary for the use of the screen netting in a screening machine. In this case, the screen netting can be provided for use in a screening machine or a sieve-type screw centrifuge, push compressor, or oscillating-screen centrifuge or other dehumidification units.

In the case of two production steps, the same abrasive additive can be used by means of water jet cutting for pre-cutting and for finish-cutting the openings. As an alternative, in the case of two production steps in the form of water jet cutting for pre-cutting and for finish-cutting, different abrasive additives can be added to the pressurized water.

In this case, the pre-cutting and/or the finish-cutting can be performed by means of water-abrasive-suspension jet cutting or by means of water-abrasive-injector jet cutting. During water-abrasive-injector jet cutting, abrasive is suctioned off from a storage container, whereby based on the procedure, small amounts of air are suctioned off. During water-abrasive-suspension jet cutting, however, a suspension that consists of water containing an abrasive is suctioned off from a storage container, whereby no air bubbles are contained in the suspension. From this results a finer cross-sectional image during water-abrasive-suspension jet cutting than during wafer-abrasive-injector jet cutting. Both production steps of the pre-cutting and the finish-cutting can be implemented with the same water jet cutting method or with different water jet cutting methods in any combination.

In this case, the pre-cutting and/or the finish-cutting of the openings of the screen netting is/are preferably carried out from the side of the screen netting, which forms the bottom of the screen netting.

The direction of flow of the openings in the screen netting in this case runs from the top of the screen netting to the bottom of the screen netting.

By the pre-cutting and/or the finish-cutting of the openings from the bottom of the screen, it is possible, by means of water jet cutting, to produce very fine openings, i.e., exactly defined narrow openings, in particular round openings and/or slots in the screen netting, without resulting in shape deviations on the edges of the in particular slot-shaped screen openings.

Especially preferably, the openings in the screen netting widen from the top of the screen netting to the bottom of the screen netting. This means that the openings preferably widen in the screen netting in the direction of flow. In this way, openings are reliably kept from clogging up by a reduction in the flow resistance as well as by the prevention of clumping of solid particles. Especially preferably, the opening half angle of the openings relative to the perpendicular is 5°-15°, in particular up to 20°.

In particular, the opening half angle of the openings relative to the perpendicular can be greater than or equal to 3°, in particular greater than, or equal to 5°, in particular greater than or equal to 8°, in particular greater than or equal to 10°, in particular greater than or equal to 12°, and in particular greater than or equal to 15°.

Also, the opening half angle of the openings relative to the perpendicular can be up to 20°, in particular up to 18°, in particular up to 15°, in particular up to 12°, in particular up to 10°, and in particular up to 8°.

Preferably, the screen netting is formed by ceramic or steel, in particular high-grade steel, or plastic.

The desired properties of the screen netting can be created by the corresponding material selection. When high-grade steel is used, it is especially advantageous that the latter is stainless and especially resistant to aggressive media. A special advantage of ceramic is the hardness of the material and thus insensitivity to abrasion, ensuring a longer service life of the screen netting.

In a preferred embodiment, the screen netting has a coating on its top. In particular, this coating can be a ceramic coating or a hard metal coating or a polyurethane coating. This coating is applied on the blank before the water jet cutting, so that the introduction of openings into the correspondingly coated blank is carried out. The coating is thus cut at the same time during the process of finish-cutting and consequently has exact edges of the openings without undesirable shape deviations or rounding of edges.

In this case, the top refers to that side that is loaded in a screening machine with the material that is to be prepared, in particular to be dried, during the use of the screen netting.

With the application of such a coating on the top of the screen netting, in this way, a protective layer of the screen netting can be produced, by which the creep behavior of the screen netting is improved. In particular, the possibility also exists of applying several coatings in the form of a sandwich-like design on the top of the screen netting in order to combine the desired material properties such as abrasion resistance and damping properties.

In an especially preferred embodiment, the screen netting thus has a coating on its top as wear protection. In this case, pretreated blanks can be processed by means of the two-stage, or multi-stage production method according to the invention by means of water jet cutting, by a pre-cutting being carried out in a first production step by means of water jet cutting, and by a finish-cutting of the openings of the screen netting being carried out in a second production step by means of water jet cutting. If a precoated blank, such as, for example, a coated sheet, is used here as a blank, in this way a screen netting that has wear protection is created by the described production method.

In another preferred embodiment, if the surface, in particular the top of the screen netting, is hardened, in particular the surface, in particular the top of the screen netting, can be hardened before the water jet cutting. In this way, it is possible to make the openings in a surface-hardened screen netting blank by means of water jet cutting in the two-stage or multi-stage method so that the screen netting has improved creep behavior.

An embodiment of the invention is depicted in the figures and is explained in more detail below. Here:

The depictions in the figures are only diagrammatic and are not true to scale.

Figure 1:
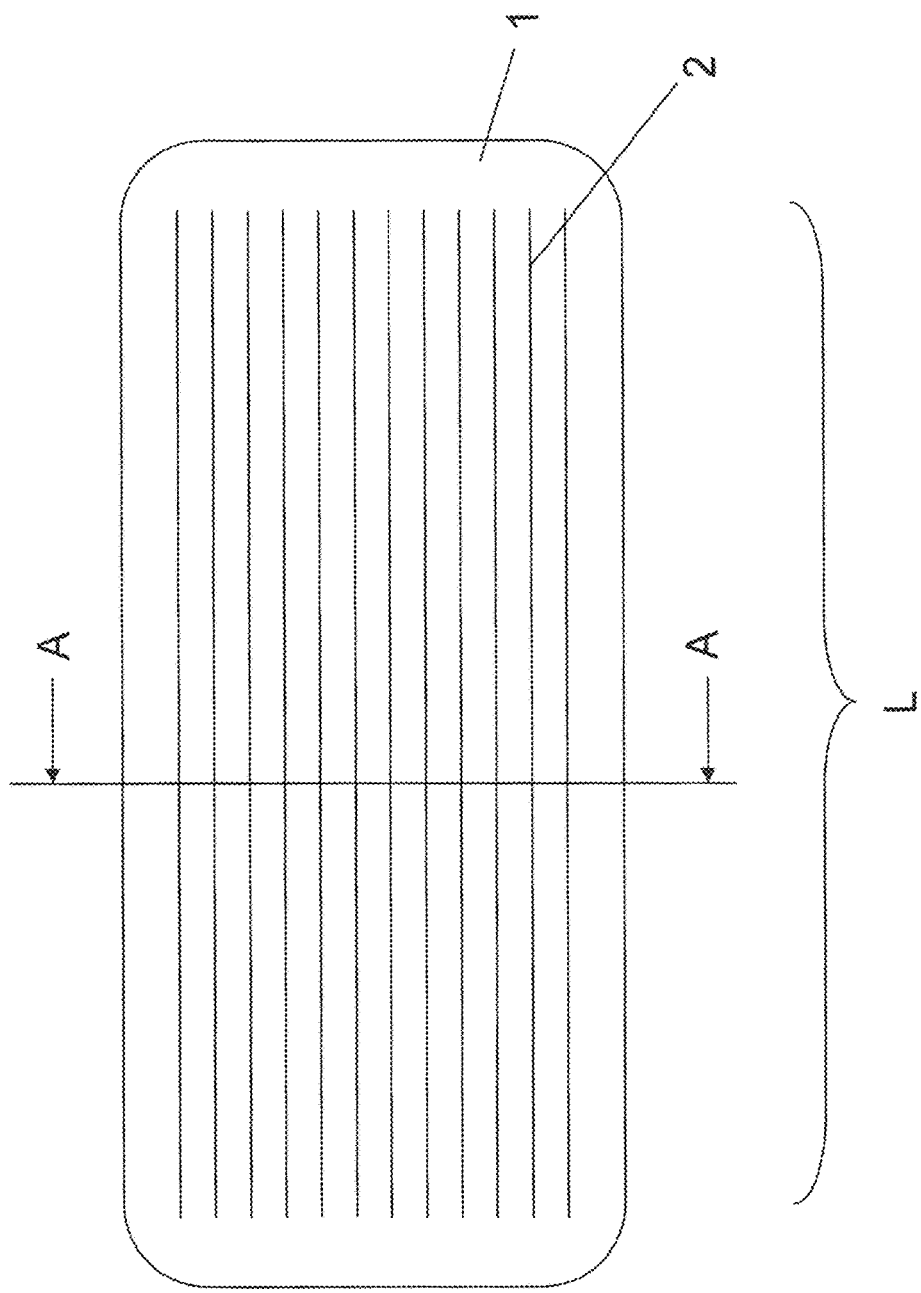
FIG. 1 shows the top view of the top of a screen netting.

FIG. 1 shows the top view of the top of a screen netting 1. The screen netting 1 according to the depicted embodiment has a number of parallel slot-shaped openings 2 of length L. The production of the slot-shaped openings 2 in the screen netting 1 is explained based on FIGS. 2-4, which show the section A-A according to FIG. 1 at various times of the production process. The production of the screen netting 1 with the openings 2 is carried out by the openings 2 being introduced in two steps into the screen netting 1 by means of water jet cutting. The production of openings 2 in two steps is explained below based on the figures.

Figure 2:
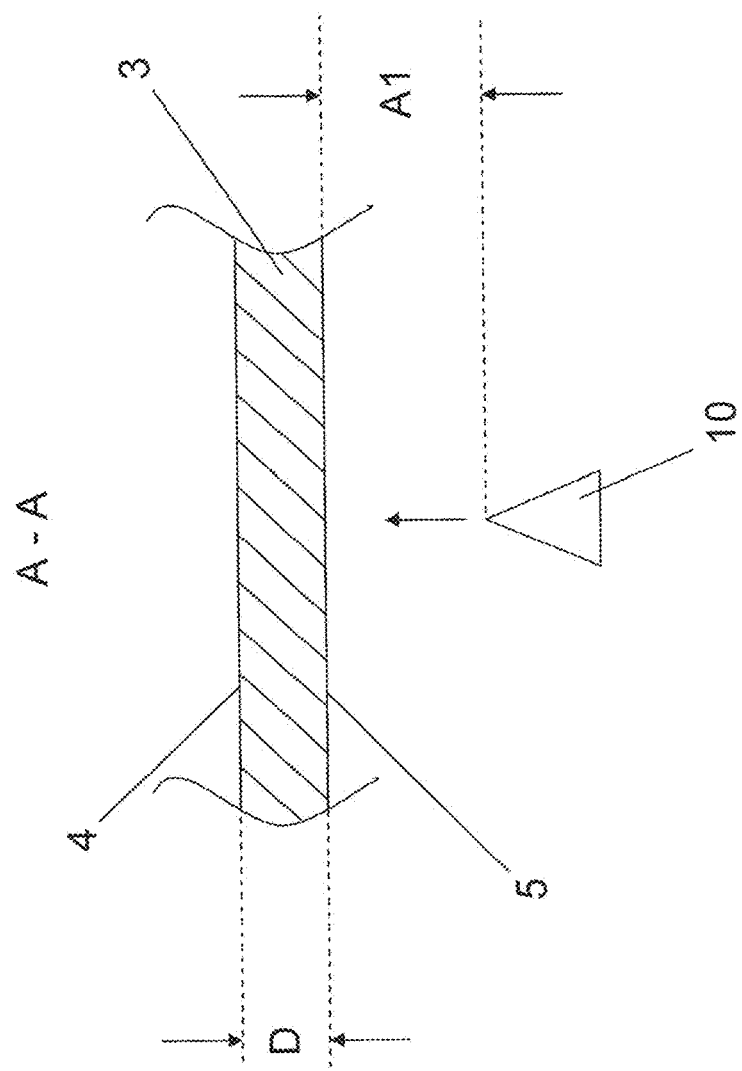
FIG. 2 shows the section A-A according to FIG. 1 of a blank before the production of the openings in the screen netting.

In FIG. 2, the blank 3 of the screen netting is depicted. The water jet cutting is done from the bottom 5. The top of the screen netting 1 is referred to with the reference number 4. The blank 3, and thus ultimately also the screen netting 1, has the thickness D.

Figure 3:
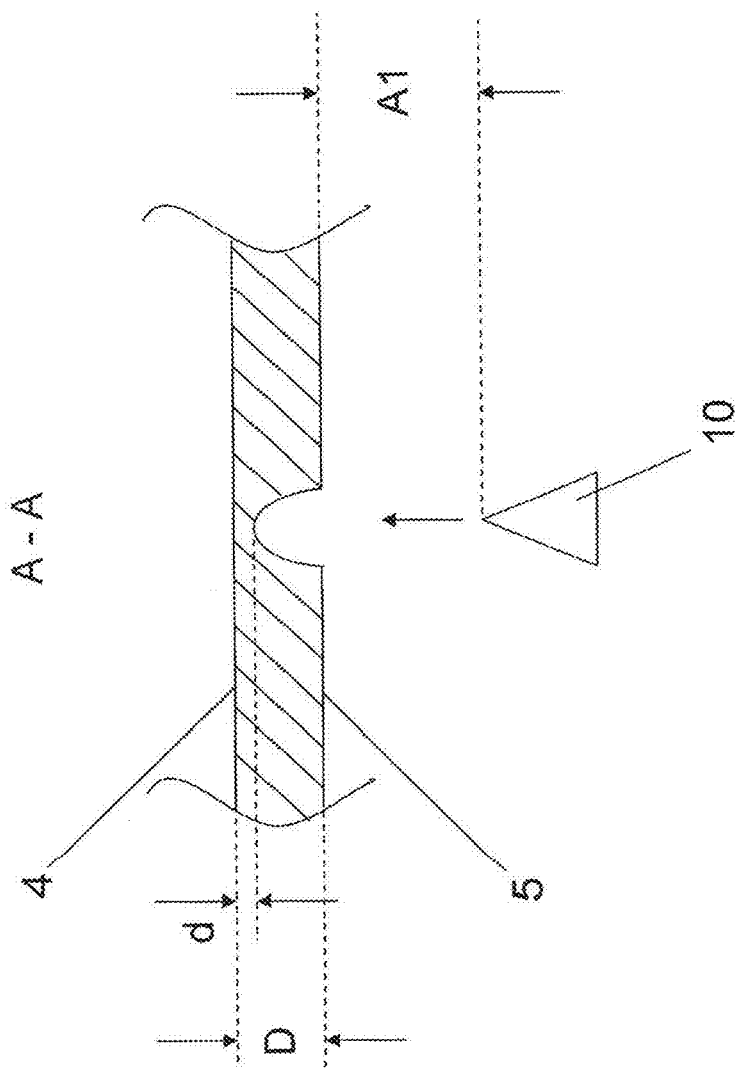
FIG. 3 shows the section A-A according to FIG. 1 after the pre-cutting of the openings in the screen netting.

In a first process step, a pre-cutting corresponding to a modeling of the openings 2 in the screen netting 1 is carried out by means of water jet cutting by means of the first nozzle 10. In the case of the pre-cutting, as is shown in FIG. 3, the opening is pre-cut from the bottom by means of the first nozzle 10 while maintaining distance A1 from the nozzle head of the nozzle 10 to the bottom 5 of the workpiece. The result of the first cutting process is shown in FIG. 3. It is shown that in this process of modeling, a material removal is carried out, whereby there is no complete cutting of thickness D, but rather a residual wall thickness d remains.

During pre-cutting, the opening angle of the opening can be set via the distance A1 from the first nozzle head 10 to the bottom 5 of the workpiece and the determination of the additional influencing factors of the flow of abrasive material, water pressure and feeding speed. The greater the distance A1 between the first nozzle 10 and the workpiece bottom 5, the greater ultimately the opening angle of the opening that is produced in this way. Conversely, the opening angle is reduced from the first nozzle 10 to the workpiece bottom 5 in the case of a reduction in the distance A1.

Figure 4:
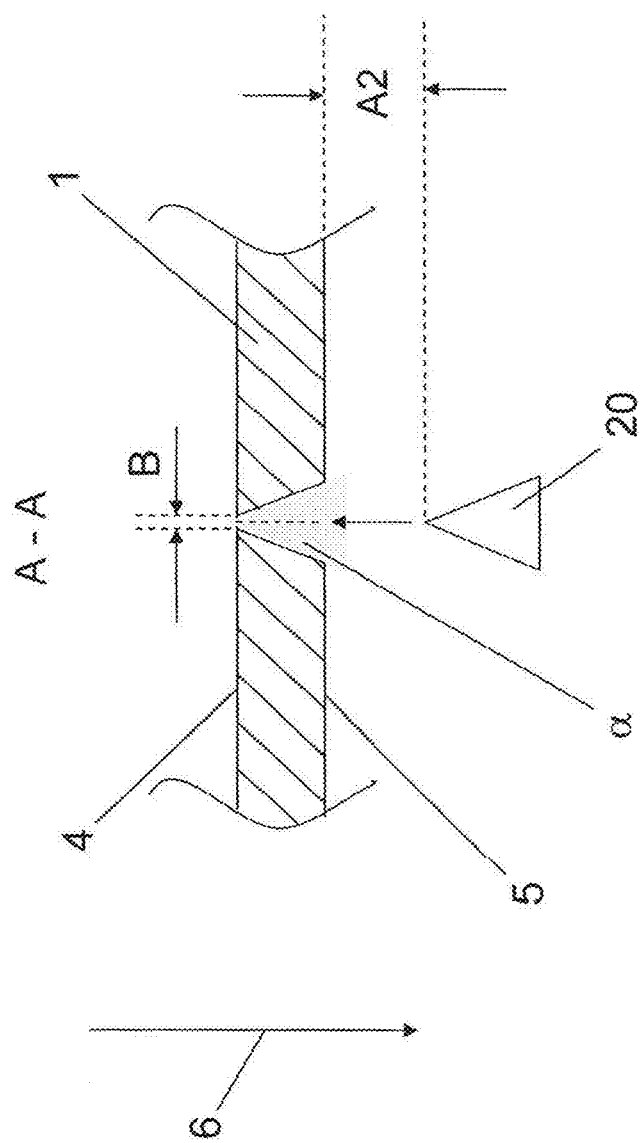
FIG. 4 shows the section A-A according to FIG. 1 after the finish-cutting of the openings in the screen netting.

In FIG. 4, the second cutting process by means of the second nozzle 20 is depicted, by means of which the finish-cutting of the nozzle opening 2 in the screen netting 1 is carried out. After the finish-cutting of the opening 2 has the width B, which is significantly smaller than the longitudinal extension L, as is shown in FIG. 1. The width B of the opening 2 is adjusted by the diameter of the second water jet cutting nozzle 20. Also, the distance A2 from the second cutting nozzle 20 to the workpiece bottom 5 is smaller than the distance A1 from the first nozzle 10 20 [sic] to the workpiece bottom 5 during pre-cutting.

Also, the opening half angle α of the opening 2, widening in the direction of flow 6, in the screen netting 1 is shown in FIG. 4. The opening half angle α of the plot of the contour of the screen netting 1 relative to the perpendicular is entered, as is indicated in FIG. 4 by the dotted line.

The opening angle and thus also the opening half angle α of the plot of the contour of the screen netting 1 relative to the perpendicular is adjusted as explained via the distance A1 from the first nozzle 10 to the workpiece and the corresponding determination of the additional influencing factors.

The direction of flow 6 is also shown in FIG. 4 when the screen netting 1 is used for dehydrating the material that is to be prepared. To this end, the material that is to be prepared strikes the top 4 of the screen netting 1, and the liquid from the material that is to be prepared drains out through the openings 2. To avoid clogging-up, the openings in the direction of flow 6 have a widening cross-section, as is shown in FIG. 4. In this way, the flow resistance in the openings is reduced, and clumping of solid particles is prevented.

Figure 5:
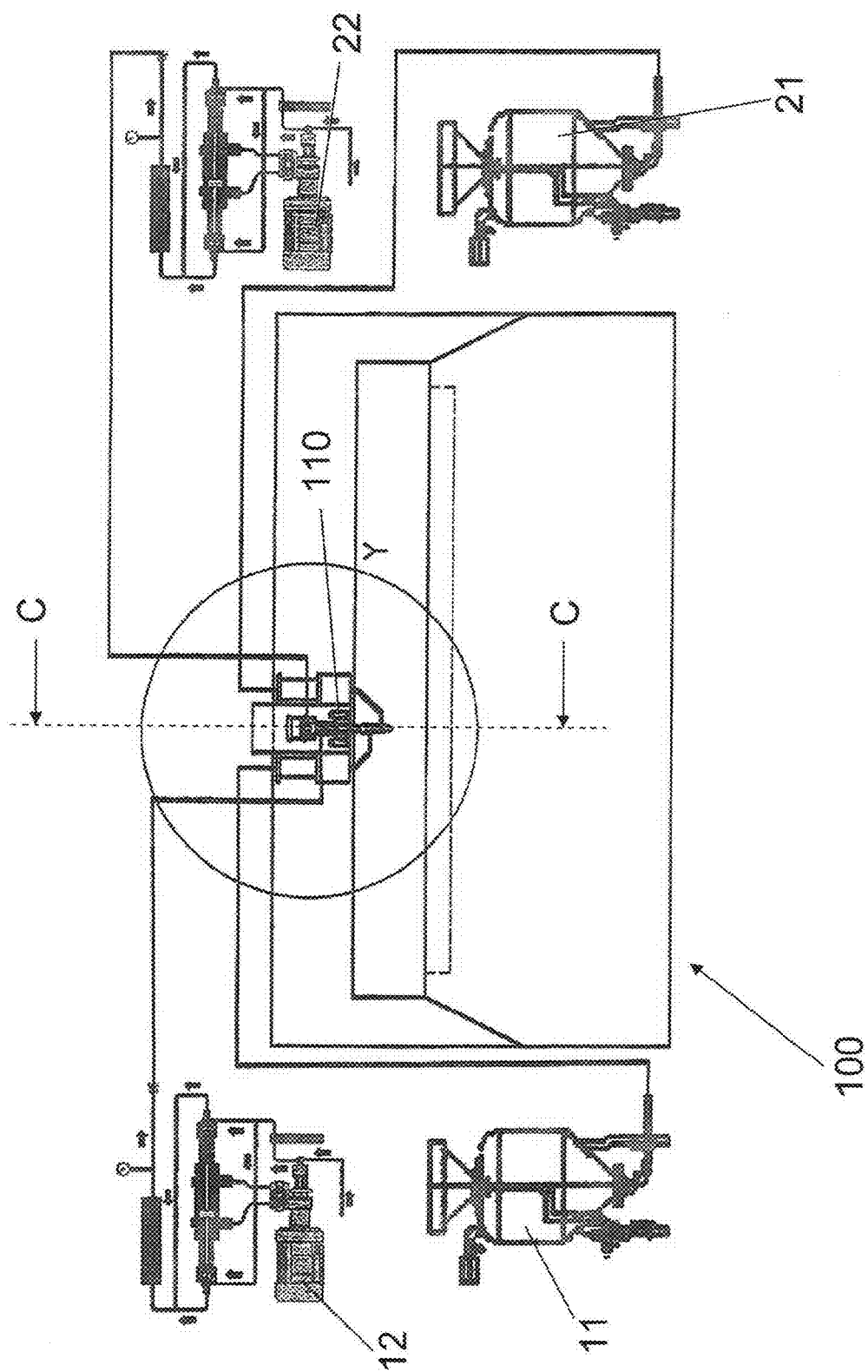
FIG. 5 shows a unit diagram of a water jet cutting unit for the production of the screen netting.

FIG. 5 shows a unit diagram of a water jet cutting unit 100 with the nozzle head 110. At the nozzle head 110, the two nozzles 10, 20 are arranged behind one another in the image plane according to FIG. 5, by means of which nozzles both the pre-cutting and the finish-cutting of the openings 2 of the screen netting 1, as is depicted in FIGS. 1-4, are performed in a single operation.

Figure 6:
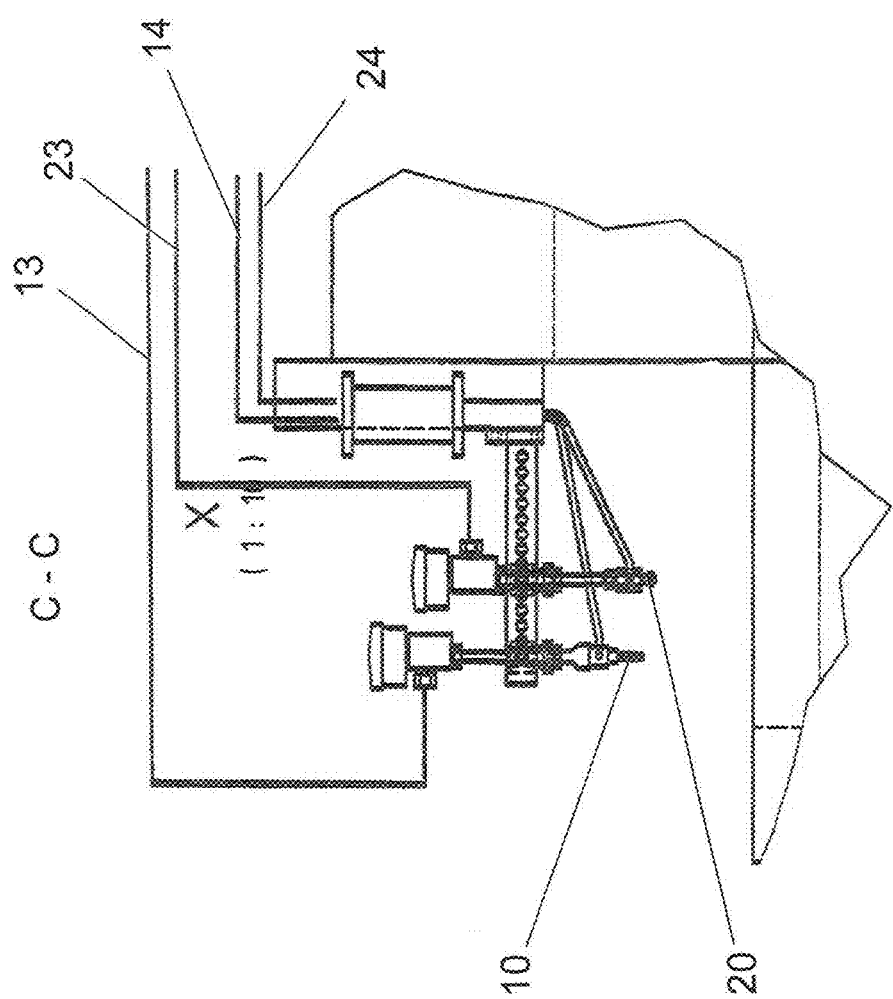
FIG. 6 shows the section C-C according to FIG. 5.

FIG. 6 shows the section C-C according to FIG. 5 in an enlarged cutaway. The nozzles that are arranged behind one another with the first nozzle 10, by means of which the pre-cutting of the openings in the screen netting is performed, as well as the second nozzle 20 arranged behind, by means of which the finish-cutting of the openings of the screen netting is performed, are shown in FIG. 6.

In FIG. 5, the abrasive supply unit 11 for supply of an abrasive additive to the first nozzle 10 is also shown. In addition, the hydraulic pump 12, by means of which the first nozzle 10 is loaded with the water pressure necessary for the pre-cutting, is shown. Located on the right side in FIG. 5 are analogously the second abrasive supply unit 21, by means of which abrasive additive is supplied to the second nozzle 20, and also the second hydraulic pump 22, by which the corresponding water pressure for the second nozzle 20 is produced, which is necessary to perform the finish-cutting of the openings 2 in the screen netting 1 by means of the second nozzle 20.

By the two-stage water jet cutting, any gap shapes, opening angles and gap widths can be made true-to-scale by modeling being carried out by pre-cutting in a first passage by means of the first nozzle 10 and in a second passage by means of the second nozzle 20, in which a finish-cutting of the openings 2 in the screen netting 1 is carried out with a micronozzle.

As depicted in FIGS. 5 and 6, in this case the first nozzle 10 as a modeling nozzle and the second nozzle 20 as a cutting nozzle are arranged behind one another in a nozzle head 110.

Both the first nozzle 10 and the second nozzle 20 automatically suction off abrasive from the abrasive supply units 11, 21 through the action of the water jet nozzle. By means of the first abrasive supply unit 11, pure abrasive is produced for the first nozzle 10. In the case of the second abrasive supply unit 21, a preparation of the abrasive additive is carried out if abrasive is prepared pre-mixed with water so that no air is suctioned off. In this way, tolerances during the cutting process are reduced by means of the second nozzle 20 since a suctioning-off of air from the second abrasive supply unit 21 is reliably prevented.

As a result of the two nozzles 10, 20 being arranged behind one another in a nozzle head 110, the pre-cutting and the finish-cutting are carried out at the same feeding speed.

In FIG. 6, the connecting lines 13, 23, 14, 24 via which the nozzle heads 10, 20 are supplied are also shown. The first nozzle head 10 is connected to the first hydraulic pump 12 via the high-pressure line 13 and is fed by this pump. The second nozzle 20 is coupled to the second hydraulic pump 22 via the second high-pressure line 23 and is fed by this pump.

In addition, the first abrasive supply line 14, via which the first nozzle 10 is fed by the first abrasive supply unit 11, is shown. In addition, the second abrasive supply line 24, via which the second nozzle 20 is fed by the second abrasive supply unit 21, is indicated in FIG. 6.

Figure 7:
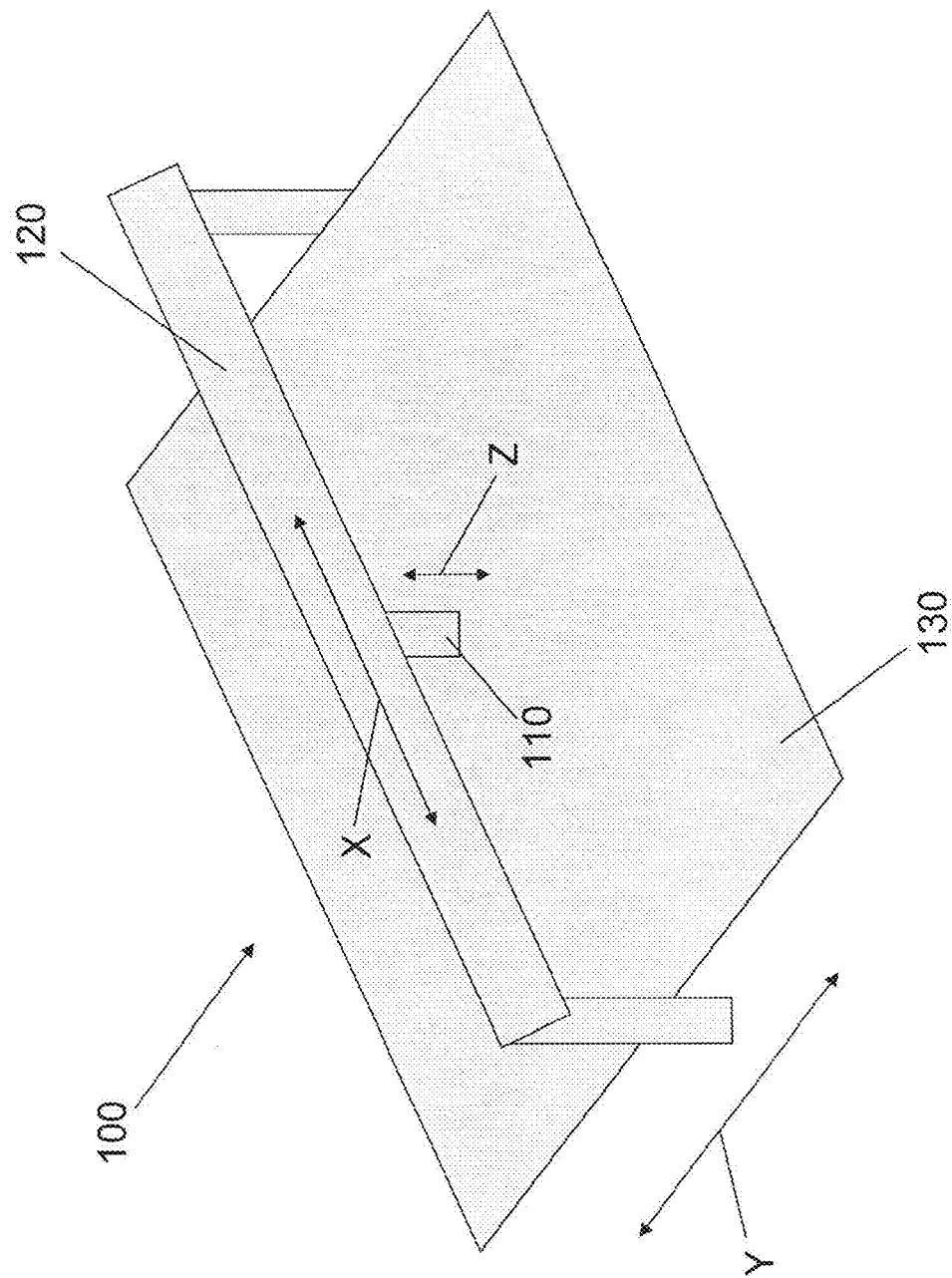
FIG. 7 shows a perspective view of the water jet cutting unit in a diagrammatic depiction.

FIG. 7 shows a perspective view of the water jet cutting unit 100 in a diagrammatic drawing. It is shown that the nozzle head 110 is arranged on a movable bridge 120. The nozzle head 110 is movable at will along the bridge 120 in the X-direction. The bridge 120 is movable at will relative to the table 130 in the Y-direction, as is indicated by the respective double arrows. Also, the nozzle head 110 is movable relative to the bridge 120 in the Z-direction in order thus to adjust the distance from the nozzle head to the table 130 and thus to the workpiece arranged on the table 130, since the distance from the nozzle head to the workpiece is an important factor in order to create the desired contour of the openings 2 in the screen netting 1.

On the bridge 120, several, for example up to 8 or 10, nozzle heads 110 can be arranged beside one another in order in this way to perform at the same time the cutting of the openings 2 in the screen netting 1 in respectively a two-stage method by means of two nozzles 10, 20 arranged behind one another on a nozzle head 110 and in this way to produce with a high effectiveness screen nettings with exact contour accuracy of the openings.

LIST OF REFERENCE SYMBOLS

1 Screen netting
2 Openings
3 Blank of the screen netting
4 Top of the screen netting
5 Bottom of the screen netting
6 Direction of flow
B Width of the openings
L Length of the openings
α Opening half angle of the openings relative to the perpendicular
10 First nozzle for the first process step of the water jet cutting (pre-cutting of the openings)
A1 Distance from the first nozzle 10 to the workpiece during pre-cutting of the openings
11 First abrasive supply unit for supply of the first nozzle 10 with an abrasive
12 First hydraulic pump for providing high-pressure water at the first nozzle 10
13 First high-pressure line to the first nozzle 10
14 First abrasive supply line to the first nozzle 10
20 Second nozzle for the second step of the water jet cutting (finish-cutting of the openings)
A2 Distance from the second nozzle 20 to the workpiece during finish-cutting of the openings
21 Second abrasive supply unit for supply of the second nozzle 20 with an abrasive
22 Second hydraulic pump for providing high-pressure water at the second nozzle 20
23 Second high-pressure line to the second nozzle 20
24 Second abrasive supply line to the second nozzle 20
D Thickness of the blank and the screen netting
d Remaining material thickness after the pre-cutting
100 Water jet cutting unit
110 Nozzle head
120 Bridge
130 Table
X, Y, Z Travel coordinates of the nozzle head 110 of the water jet cutting unit 100

The invention claimed is:

1. A method for producing a screen netting having a plurality of defined openings in a blank of sheet material selected from the group consisting of metals and ceramics, by water jet cutting, comprising the steps of:
    modeling an opening width and opening angle (α) and sheet material thickness to define the openings of the screen netting;
    pre-cutting of the openings in the sheet material to a defined depth wherein the openings widen in the direction of flow and;
    finish-cutting the openings of the sheet material to produce a screen netting in accordance with the defined opening width and opening angle (α) and sheet material thickness modeling.

2. The method according to claim 1 wherein the pre-cutting and the finish-cutting are performed by water-abrasive-suspension jet cutting or water-abrasive-injector-jet cutting.

3. The method according to claim 2 wherein the pre-cutting and the finish-cutting are performed by two nozzles arranged behind one another on a nozzle head.

4. The method according to claim 1 wherein the pre-cutting step and the finish-cutting step are performed by a pair of nozzles on a nozzle head wherein a first pre-cutting nozzle is arranged behind a finish-cutting second nozzle.

5. The method according to claim 1 wherein the pre-cutting and the finish-cutting are performed using the same water pressure or different water pressures.

6. The method according to claim 1 wherein during pre-cutting, a sheet material removal step is added and carried out up to a defined material thickness, whereby no through openings are cut.

7. The method according claim 1 wherein a sheet material thickness of from 0.5 mm up to 2.0 mm remains after a sheet material removal step during pre-cutting.

8. The method according to claim 1 wherein the finish-cutting and the pre-cutting are performed with the same water pressure or wherein the finish-cutting is performed with a higher water pressure than the pre-cutting or wherein the pre-cutting is performed with a higher water pressure than the finish-cutting.

9. The method according to claim 1 wherein the pre-cutting is performed with a suspension containing an abrasive additive.

10. The method according to claim 1 wherein the finish-cutting is performed with a suspension containing an abrasive additive.

11. The method according to claim 4 wherein the distance between the first precutting nozzle and the sheet material during pre-cutting is greater than the distance between the second finish cutting nozzle and the sheet material during finish-cutting.

12. A screen netting for extracting flowable liquids in a centrifuge, wherein said screen netting is fabricated from a blank of sheet material having a defined sheet material thickness, said sheet material selected from the group consisting of metals and ceramics, said screen netting having a plurality of defined openings and wherein the openings of the screen netting are created by water jet cutting and comprise an opening width and opening angle (α) and further wherein the openings widen in the direction of flow and, wherein the opening angle (α) further comprises a half angle (1/α) of the openings relative to the perpendicular in a range greater than or equal to about 3° up to about 15°.

13. The screen netting according to claim 12 wherein the opening angle (α) further comprises a half angle (1/α) of the openings relative to the perpendicular which is from about 8° up to about 20°.

14. The screen netting according to claim 12, wherein the sheet material further comprises a surface coating selected from the group consisting of ceramics, hard metals and polyurethanes which is applied on the screen netting sheet material blank.

15. A method for producing a screen netting having a plurality of defined openings in a blank of plastic sheet material by water jet cutting, comprising the steps of:
    modeling an opening width and opening angle (α) and sheet material thickness to define the openings of the screen netting;
    pre-cutting of the openings in the sheet material to a defined depth wherein the openings widen in the direction of flow and;
    finish-cutting the openings of the sheet material to produce a screen netting in accordance with the defined opening width and opening angle (α) and sheet material thickness modeling;

wherein the pre-cutting and the finish-cutting are performed by water-abrasive-suspension jet cutting or water-abrasive-injector-jet cutting.

\* \* \* \* \*